United States Patent [19]

Takiura et al.

[11] 4,113,822
[45] Sep. 12, 1978

[54] METHOD OF DISPERSING INORGANIC ADDITIVES WITHIN EXTRUDER

[75] Inventors: Mamoru Takiura, Kawasaki; Yoshihiro Hayashizaki, Sagamihara, both of Japan

[73] Assignee: Ikegai Tekko Kabushiki Kaisha, Tokyo, Japan

[21] Appl. No.: 773,669

[22] Filed: Mar. 2, 1977

Related U.S. Application Data

[63] Continuation of Ser. No. 602,143, Aug. 5, 1975, abandoned.

[30] Foreign Application Priority Data

Aug. 9, 1974 [JP] Japan .................. 49-91224

[51] Int. Cl.² .............................. B29B 1/04
[52] U.S. Cl. ...................... 264/349; 366/85; 260/42.28; 264/68; 264/176 R; 264/211; 425/204; 425/208
[58] Field of Search ............... 264/211, 176 R, 349, 264/68; 425/204, 208, 376 R; 259/192; 260/42.28

[56] References Cited

U.S. PATENT DOCUMENTS

| | | | |
|---|---|---|---|
| 2,543,894 | 3/1951 | Colombo | 425/204 |
| 2,615,199 | 10/1952 | Fuller | 264/211 |
| 2,632,203 | 3/1953 | De Laubarede | 264/349 |
| 3,398,014 | 8/1968 | Turner | 264/176 R |
| 3,421,182 | 1/1969 | Colombo | 425/204 |
| 3,523,916 | 8/1970 | Needham et al. | 264/211 |

OTHER PUBLICATIONS

Fisher, "Multi–Screw Extrusion Machines", Extrusion of Plastics, Interscience Publishers, 6-1964, pp. 79-94 and 105.
"Twin-Screw Extruders Push for New Applications", Gras, Plastics Technology, Feb. 1972, pp. 40-43.

*Primary Examiner*—Jeffery R. Thurlow
*Attorney, Agent, or Firm*—Blanchard, Flynn, Thiel, Boutell & Tanis

[57] ABSTRACT

The temperature of the molten mixture within a multi-screw extruder is maintained in the range of from the melting point of the macromolecular material up to 20° C above said melting point, by an extruder having at least 2 screws, said extruder being constructed such that the ratio (H/D) of the diameter (D) of the screws to the interlocking depth (H) of the screws is equal to or less than 0.1 and the flow of the mixture of inorganic additive and macromolecular material within the screws can be so controlled that the difference in residence time of more than 90% of said mixture is no more than ±10% relative to the prescribed residence time, whereby the dispersion of said inorganic additive is extremely improved.

4 Claims, 4 Drawing Figures

C: ACTUAL CONCENTRATION OF TRACER
C₀: STANDARD CONCENTRATION OF TRACER
t: ACTUAL RESIDENCE TIME
t̄: AVERAGE RESIDENCE TIME

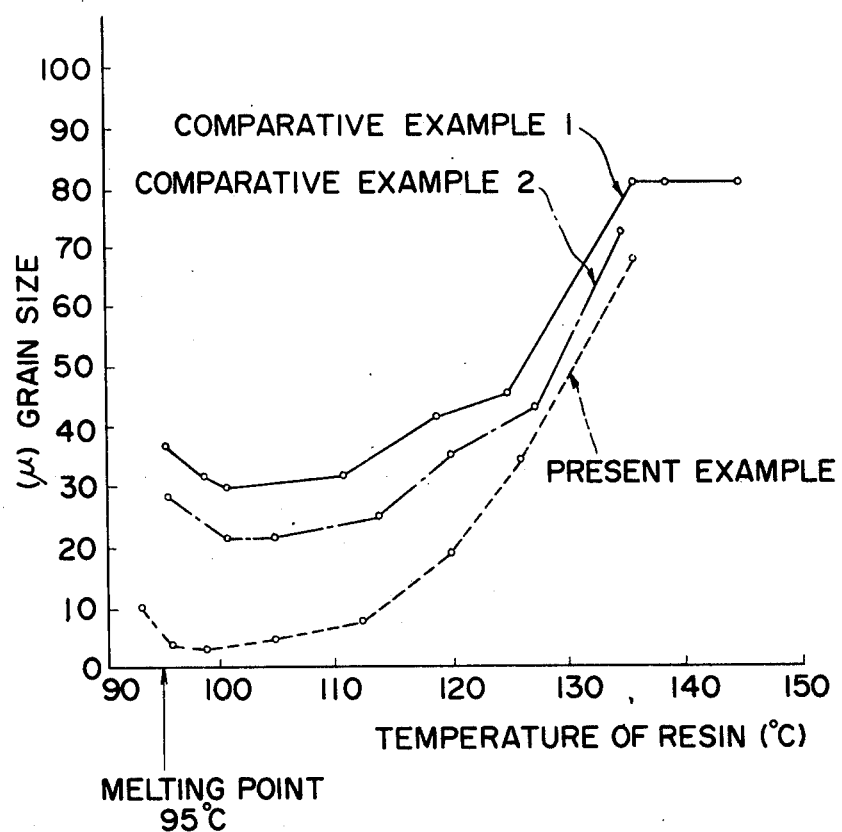

METHOD OF DISPERSING INORGANIC ADDITIVES WITHIN EXTRUDER

This is a continuation of application Ser. No. 602,143 filed Aug. 5, 1975 now abandoned.

BACKGROUND OF THE INVENTION (a) Field of the Invention

The present invention relates to a method of dispersing inorganic additives uniformly in macromolecular materials.

(b) Description of the Prior Art

The art of uniformly dispersing fillers like calcium carbonate, pigments and other inorganic additives in macromolecular materials has not yet been developed sufficiently, so that, as the practical means of performing said dispersion, the use of mixers, mixing rolls and the like has been the main procedure. Meanwhile, due to the shortage of materials which has started from the petroleum crisis and the demand for materials which do not cause public nuisances or which are poorly flammable, a marked tendency to add a large quantity of inorganic filler to macromolecular materials is seen lately. In the case of paints, there is occuring a shift from the organic solvent type paint to the powder type paint by taking into consideration the environment sanitation, public nuisance, and so forth. As the method of manufacturing such powder-type paints, it is being gradually changed from the conventional roll system to the extrusion system employing an extruder from the view point of mass production, stabilization of quality, environment sanitation, economy of energy and so on. In the extrusion system, the effect of dispersing inorganic additives varies with the type of extruder, but the cause of such difference is yet to be clarified. Under the existing circumstances as set forth above, therefore, at the production plant, efforts are being exerted to improve the dispersion efficiency by analyzing each phenomenon observed and modifying the shape of screw, the condition of temperature for the cylinder, the mixing ratio of macromolecular material to inorganic additive, etc. on the basis of the result of said analysis.

When the dispersion of the inorganic additive in the macromolecular material is insufficient, it is infeasible to obtain a product with the intended properties, and the surface of the product becomes poor in glossiness and rough. Concerning powder-type paints when the dispersion of the pigment therein is insufficient, the surface of the coating film after application is dotted with fine protuberances of scores of microns in size, so that the product is unmarketable. Accordingly, when it is intended to effect uniform dispersion of inorganic additives by the use of an extruder, inasmuch as any definite prerequisite for ensuring the improvement in the quality and stability of the product has not been clarified or a thorough analysis has not been made about the dispersion mechanism of inorganic additives, the conventional extruders leave something to be desired with respect to the construction and the condition of operation.

Referring to the appended drawings,

FIG. 4 is a graph showing the data of the comparative examples and the embodiment of the present invention.

SUMMARY OF THE INVENTION

Figure 1:
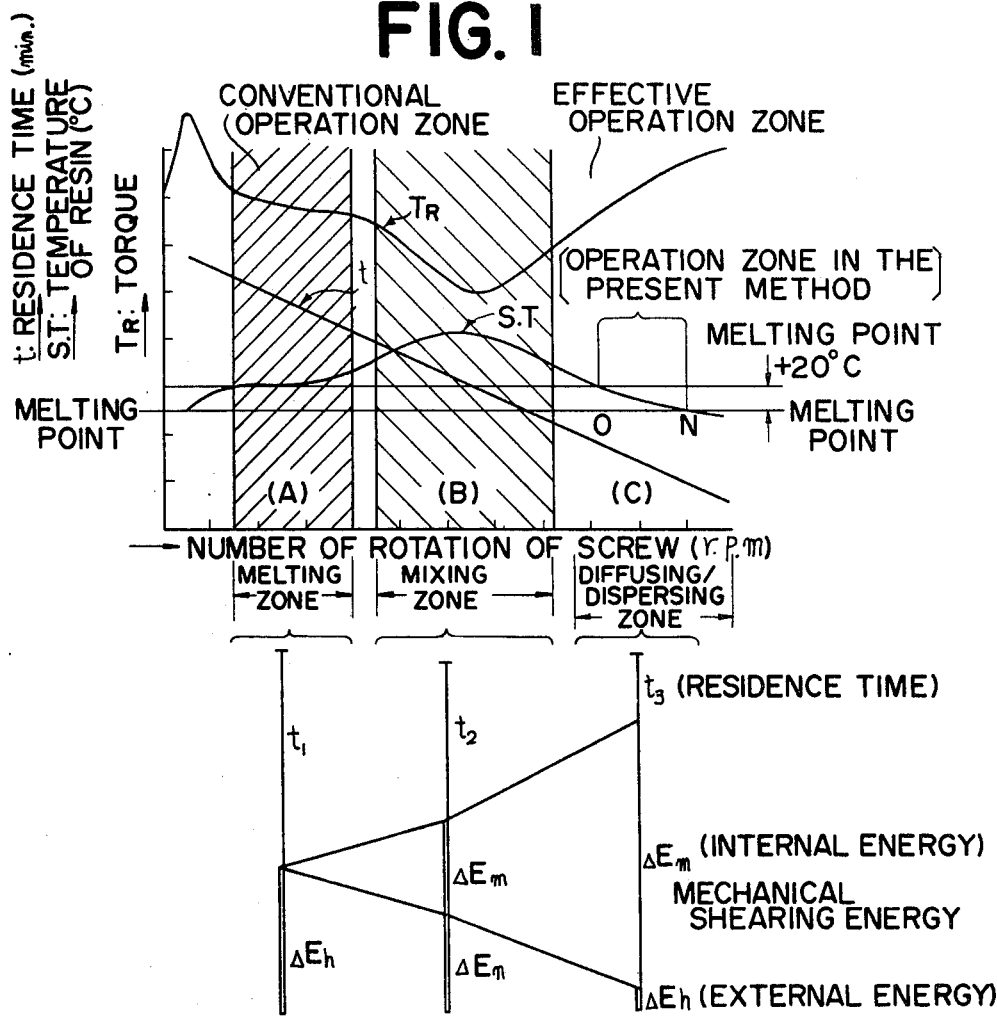
FIG. 1 shows curves indicative of the interrelation of the temperature of resin, the residence time in the screw and the torque relative to the rate of rotation (r.p.m.) of the extruder, coupled with a diagram illustrative of the operation zone, the range of temperature and the amount of energy in each operation zone according to the conventional method and the present invention.

The present inventors have conducted the following experiments for the purpose of clarifying prerequisites for effecting uniform dispersion of inorganic additives in macromolecular materials. That is, as seen in FIG. 1, when the rate of rotation of the screw of the extruder is gradually increased, there exists a zone A wherein the mixture of macromolecular material and inorganic additive is heated to a molten state by an external heater. This zone A is the zone wherein the mechanical shearing action effected by the rotation of screw is not great so that the molten resin can be controlled to have a prescribed temperature, and the extruder is generally operated in this zone. However, this zone cannot provide an amount of energy sufficient for crushing the inorganic additive grains after their second aggregation, and accordingly, the effect of the rotation of screw is no more than a stirring of the grains. Besides, though the residence time in the screw is admittedly long, the surroundings of the additive grains become wetted with the molten macromolecular material during this period, and once its surroundings are thus wetted, the grains can hardly be crushed again.

In the zone B where the number of rotations of the screw is further increased, the mechanical shearing action becomes greater. But, this energy is mostly turned into heat and the temperature of the molten resin rises to thereby lower the viscosity of the molten resin, so that the mechanical energy is not effectively used for the shearing action and the effect of dispersion will fall short of one's expections.

As to the zone C wherein the number of rotations of the screw is still further increased, one is apt to conceive that the temperature further rises therein and the macromolecular materials becomes decomposed. Some macromolecular material like, for instance, polyvinyl chloride, will admittedly by decomposed, but in the case of such macromolecular materials as polypropylene, polyethylene and epoxide resin, the temperature of the molten resin begins to decrease as the speed of rotation of the screw increases. When a pre-mixture consisting of the latter macromolecular material and an inorganic additive is extruded by the use of an extruder, there is not sufficient time to permit the mechanical energy imparted by the mechanical shearing action to raise the temperature of molten resin and lower the viscosity thereof in the zone C, and the material is extruded intact after having been subjected to the shearing action. Inasmuch as the temperature of the molten resin does not rise, the viscosity thereof is high, and almost all mechanical energy imparted thereto is effectively used for the shearing action as above. This shearing action directly crushes the inorganic additive and diffuses it. Such condition can never be achieved in the zone A. As to the temperature of molten resin on this occasion, a temperature in the range of from the lower limit corresponding to the melting point of the macromolecular material to the upper limit which is higher than said lower limit by 20° C. is most effective, and this temperature is also within the scope of requirements for realizing the effect of wetting and dispersion subsequent to the diffusion.

As the result of the above experiment, the following matters have been brought to light as the prerequisite for ensuring uniform dispersion of inorganic additives in macromolecular materials: namely, (1) the step of diffusing the inorganic additive grains present in the macromolecular material as a secondary agglomerate composed of a group of primary grains the inorganic additive by crushing said agglomerate by applying some mechanical energy before said macromolecular material melts and wets the surroundings of these grains, said step of diffusion being supposed to be performed in the narrowest possible range of temperature with its lower limit corresponding to the melting point of said macromolecular material and by applying a lot of mechanical energy; (2) the step of wetting the surroundings of the thus diffused primary grains of inorganic additive with the melted macromolecular material; (3) the step of uniformly dispersing the primary grains of inorganic additive thus wetted with macromolecular material in the molten macromolecular material by the force of the imparted mechanical energy; etc. Even when the steps (2) and (3) are carried out simultaneously, the final effect is the same, but it is absolutely necessary to carry out the step (1) first of all.

Figure 2:
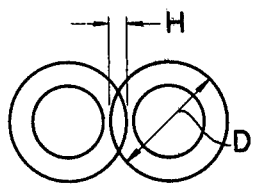
FIG. 2 is a diagram illustrative of the relation between the screws of an extruder for use in the present invention.
Figure 3:
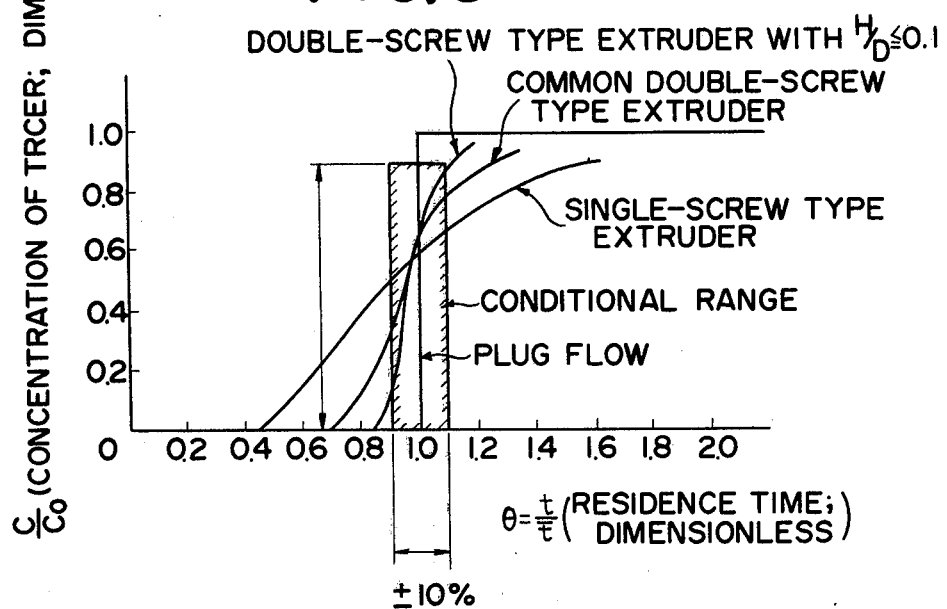
FIG. 3 is a diagram illustrative of the system of flow within the extruder.

Further, as the result of experiment conducted about the conditions of the extruder necessary for effecting uniform dispersion of inorganic additive as above, the following matters have been brought to light: as shown in FIG. 2, the relation between the diameter D of the screws and the interlocking depth H of the screw is to be $H/D \leq 0.1$. And as shown in FIG. 3, the uniformity of the residence time is to be within $\pm 10\%$, the uniformity of mixture by the place within the extruder is to be more than 90%, etc. That is, in the case where the screw is rotated at a high speed, the so-called residence time, that is, the time required for extruding the mixture after its entry in the screw, is to be uniform and the mixture is to be subjected to uniform mechanical shearing action regardless of the location thereof relative to the screw. These two conditions are absolutely necessary, and when the fail to be satisfied, the stability of quality cannot be ensured. The above conditions have been ascertained on the basis of experiments of various sizes of single-screw type extruders and double-screw type extruders (including both deep-groove and shallow-groove type extruders with screws turning in the same direction or in the opposite directions), and an extruder satisfying these conditions can be employed for continuous operation even when the material is a thermosetting resin comprising a hardener.

In the last analysis, in order to disperse inorganic additives uniformly in macromolecular materials and to extrude the mixture continuously from an extruder, it is necessary that (1) the extruder is of a construction such that, from the view point of the effect of conveying the material by the rotation of screw, the dependency on the location of material and the dependency on the residence time for material are uniform as far as possible, (2) the range of the speed of rotations of screw exceeds the range of the rise of temperature of the molten material (resin) owing to the mechanical shearing action of screw, and there is not sufficient time to permit the energy imparted by said mechanical shearing action to be converted into heat to raise the temperature of resin, but, on the contrary, the extruder is operated in the range of high speed rotation of screw where the phenomenon of the lowering of temperature of the molten resin takes place, and (3) the extruder is operated in a zone where the temperature of the molten resin is reduced when the speed of rotation of the screw is increased and at a temperature in the range of from the lower limit corresponding to the melting point of the macromolecular material to the upper limit which is higher than said lower limit by 20° C.

DESCRIPTION OF THE PREFERRED EMBODIMENTS

The present invention has been accomplished on the basis of these findings, and it provides a method of dispersing inorganic additives in macromolecular materials by means of an extruder having at least 2 screws, said extruder being of construction such that the ratio (H/D) of the interlocking depth (H) of the screws to the diameter (D) of the screws is equal to or less than 0.1 and the flow of the mixture within the screws can be so controlled that the difference in residence time of more than 90% of the mixture is no more than $\pm 10\%$ relative to the prescribed residence time, while maintaining the temperature in the range of from the lower limit corresponding to the melting point of the macromolecular material to the upper limit which is higher than said lower limit by 20° C., in the zone where the temperature of melted resin is reduced when the speed of rotation of the screws is increased.

| Comparative Example 1. | PHR |
|---|---|
| resin (Epikote 1004, an epoxide resin manufactured by SHELL Oil Co., England) | 100 |
| pigment (Titanium RCR 3, a titanium oxide manufactured by ISHIHARA SANGYO K.K.) | 60 |
| thixotropying agent (Aerosil 200, a product of NIPPON AEROSIL K.K.) | 2 |
| flow-controlling agent (modaflow, an inorganic powder manufactured by Monsanto Co., USA) | 0.7 |
| hardener (dicyandiamide) | 5 |

The material having the above composition was pre-mixed be means of a Henschel mixer for 10 minutes while maintaing the temperature of the resin at 50° C.. The thus prepared mixture (grain size: 100u) was then supplied to a double-screw type extruder (diameter (D) of screw =97 mm, interlocking depth (H) of screw =20 mm, H/D=0.2, L/D=7, speed of rotation of screws =40 r.p.m.), whereby it was melted by heating and extruded. The result was as shown in FIG. 4 (the curve for Comparative Example 1). The extruder employed was one in practical use capable of disposing of about 50 Kg of material per hour.

COMPARATIVE EXAMPLE 2.

The same pre-mixed material as used in Camparative Example 1 was fed to a double-screw type extruder (diameter (D) of screws =97 mm, interlocking depth (H) of screws =20 mm, H/D=0.2, L/D=1.1, speed of rotation of screws =120 r.p.m.), whereby extrusion was performed. The result was as shown in FIG. 4 (the curve for Comparative Example 2).

EXAMPLE (EMBODIMENT OF THE PRESENT INVENTION)

The same pre-mixed material is used in Comparative Example 1 was fed to a double-screw type extruder (diameter (D) of screws =87 mm, interlocking depth (H) of screws =8 mm, H/D=0.09, L/D=15, speed of rotation of screws =200 r.p.m), whereby extrusion was performed. The result was as shown in FIG. 4 (the curve for Present Example). As is clear from the showing, the effect of making the interlocking depth of screw is extensively demonstrated, so that when the speed of rotation of the screws is increased, the temperature of resin is reduced, and when said temperature approaches the melting point of resin, the dispersion effect is improved conspicuously.

What is claimed is:

1. A process for uniformly dispersing inorganic additive particles in a synthetic resin that does not decompose at a temperature in the range between its melting point and a temperature 20° C. above its melting point and that possesses the property that when it is molten and agitated in the below-mentioned twin screw extruder its temperature decreases within said temperature range as the speed of rotation of the screws increases within a range of high speed rotation of said screws, which comprises the steps of: continuously feeding a pre-blended mixture of inorganic additive particles and said synthetic resin in a non-molten state into a twin-screw extruder in which the screws have the same external thread diameter and the threads of the screws intermesh with the exterior of the thread of one screw being radially spaced from the radially opposed portion of the root of the other screw and with the ratio of $$\frac{\text{radial depth of the zone where the screw threads intermesh}}{\text{external thread diameter of the screws}}$$

being equal to or less than 0.1, and simultaneously rotating said screws at a high speed effective to apply, along the entire lengths of said screws, a uniform high internal mechanical shearing energy to said mixture sufficient initially to break up agglomerates of said inorganic additive particles into primary inorganic additive particles before said resin becomes molten and then after said resin has become molten, wetting the surfaces of the primary inorganic additive particles with the molten resin and dispersing said wetted primary inorganic additive particles in the remainder of the molten resin whereby to form a uniform dispersion of said primary inorganic additive particles in said molten resin, the rotation of the screws being carried out such that the ratio of $$\frac{\text{actual residence time of at least 90\% the mixture in the extrusion zone}}{\text{the average residence time of the mixture as a whole in the extrusion zone}}$$

is from 0.9 to 1.1, the temperature in the extrusion zone is maintained in the range of from the melting point of the resin to 20° C. above said melting point as a maximum and the speed of rotation of the screws is maintained in the range wherein an increase in the speed of rotation of the screws causes the temperature of the resin in a molten state to decrease within said temperature range.

2. A process according to claim 1 in which said resin is a thermosetting epoxide resin containing a hardener.

3. A process according to claim 1 in which said resin is polypropylene resin.

4. A process according to claim 1 in which said resin is polyethylene resin.

* * * * *